(12) United States Patent
Aksit et al.

(10) Patent No.: US 11,694,416 B2
(45) Date of Patent: Jul. 4, 2023

(54) INTUITIVE EDITING OF THREE-DIMENSIONAL MODELS

(71) Applicant: ADOBE INC., San Jose, CA (US)

(72) Inventors: Duygu Ceylan Aksit, San Jose, CA (US); Vladimir Kim, Seattle, WA (US); Siddhartha Chaudhuri, Bangalore (IN); Radomir Mech, Mountain View, CA (US); Noam Aigerman, San Francisco, CA (US); Kevin Wampler, Seattle, WA (US); Jonathan Eisenmann, San Francisco, CA (US); Giorgio Gori, Ottawa (CA); Emiliano Gambaretto, San Francisco, CA (US)

(73) Assignee: Adobe, Inc., San Jose, CA (US)

( * ) Notice: Subject to any disclaimer, the term of this patent is extended or adjusted under 35 U.S.C. 154(b) by 0 days.

(21) Appl. No.: 17/208,627

(22) Filed: Mar. 22, 2021

(65) Prior Publication Data

US 2021/0256775 A1    Aug. 19, 2021

Related U.S. Application Data

(63) Continuation of application No. 16/204,980, filed on Nov. 29, 2018, now Pat. No. 10,957,117.

(30) Foreign Application Priority Data

Oct. 15, 2018   (IN) .............................. 201811039066

(51) Int. Cl.
*G06T 15/00* (2011.01)
*G06T 19/20* (2011.01)
(Continued)

(52) U.S. Cl.
CPC .......... *G06T 19/20* (2013.01); *G06F 3/04815* (2013.01); *G06F 3/04845* (2013.01); *G06T 2200/24* (2013.01); *G06T 2219/2016* (2013.01)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS 6,781,597 B1 * 8/2004 Vrobel .................... G06T 19/20
715/848
9,063,951 B1    7/2015 Zhu et al.
(Continued)

*Primary Examiner* — Gordon G Liu
(74) *Attorney, Agent, or Firm* — Shook, Hardy & Bacon, L.L.P.

(57) ABSTRACT

Embodiments of the present invention are directed towards intuitive editing of three-dimensional models. In embodiments, salient geometric features associated with a three-dimensional model defining an object are identified. Thereafter, feature attributes associated with the salient geometric features are identified. A feature set including a plurality of salient geometric features related to one another is generated based on the determined feature attributes (e.g., properties, relationships, distances). An editing handle can then be generated and displayed for the feature set enabling each of the salient geometric features within the feature set to be edited in accordance with a manipulation of the editing handle. The editing handle can be displayed in association with one of the salient geometric features of the feature set.

19 Claims, 8 Drawing Sheets

(51) Int. Cl.
  *G06F 3/04815*  (2022.01)
  *G06F 3/04845*  (2022.01)
(58) Field of Classification Search
  USPC .......................................................... 345/419
  See application file for complete search history.

(56) References Cited

U.S. PATENT DOCUMENTS

| | | | |
|---|---|---|---|
| 2007/0071323 A1* | 3/2007 | Kontsevich | G06F 16/7847 |
| | | | 707/E17.02 |
| 2013/0083021 A1* | 4/2013 | Cohen | G06T 17/00 |
| | | | 345/420 |
| 2013/0311450 A1* | 11/2013 | Ramani | G06F 16/5854 |
| | | | 707/722 |
| 2014/0169697 A1* | 6/2014 | Breckenridge | G06T 11/60 |
| | | | 382/284 |
| 2019/0221027 A1* | 7/2019 | Petkov | G06T 15/08 |

* cited by examiner

INTUITIVE EDITING OF THREE-DIMENSIONAL MODELS

CROSS-REFERENCE TO RELATED APPLICATION

This application is a Continuation of Ser. No. 16/204,980 filed Nov. 29, 2018 and titled "INTUITIVE EDITING OF THREE-DIMENSIONAL MODELS" the entire contents of which are incorporated by reference herein.

BACKGROUND

Oftentimes, three-dimensional models or representations are generated in the form of polygon meshes (also referred to herein as three-dimensional meshes). A polygon mesh generally includes vertices, that represent points in three-dimensional space, as well as polygons that define the shape of an object in three dimensions. To edit three-dimensional models, a user may manipulate wires or curves associated with the three-dimensional model. A wire or curve may refer to a line segment associated with the three-dimensional model. However, as three-dimensional models can correspond with an extensive number of wires or curves, particularly in complex three-dimensional models, editing the three-dimensional models can be time consuming and tedious.

SUMMARY

Embodiments of the present invention are directed towards facilitating intuitive and efficient editing of three-dimensional models. In particular, an editing handle can be provided that enables manipulation of a set of wires or curves. In this way, the set of wires or curves can be edited in a manner indicated by a manipulation of the editing handle. Further, by presenting a single editing handle that corresponds with multiple related wires or curves, the user interface is less crowded providing for a more intuitive and desirable experience for a user. In addition, as edits may be desired to effect other aspects of the three-dimensional model, embodiments described herein provide for propagating edits to other wires or curves within a region of influence. In this way, an edit may be propagated to other curves within the three-dimensional model without necessarily applying the same edits to the entirety of the model. Such an implementation generally reduces an undesired effect of a global edit.

DETAILED DESCRIPTION

Three-dimensional models generally define an object in three dimensions. In this regard, objects can be defined by three-dimensional models via a mathematical definition of the object in three dimensions. Oftentimes, three-dimensional models or representations are generated in the form of polygon meshes (also referred to herein as three-dimensional meshes). A polygon mesh generally includes vertices, that represent points in three-dimensional space, as well as polygons that define the shape of an object in three dimensions.

Figure 1:
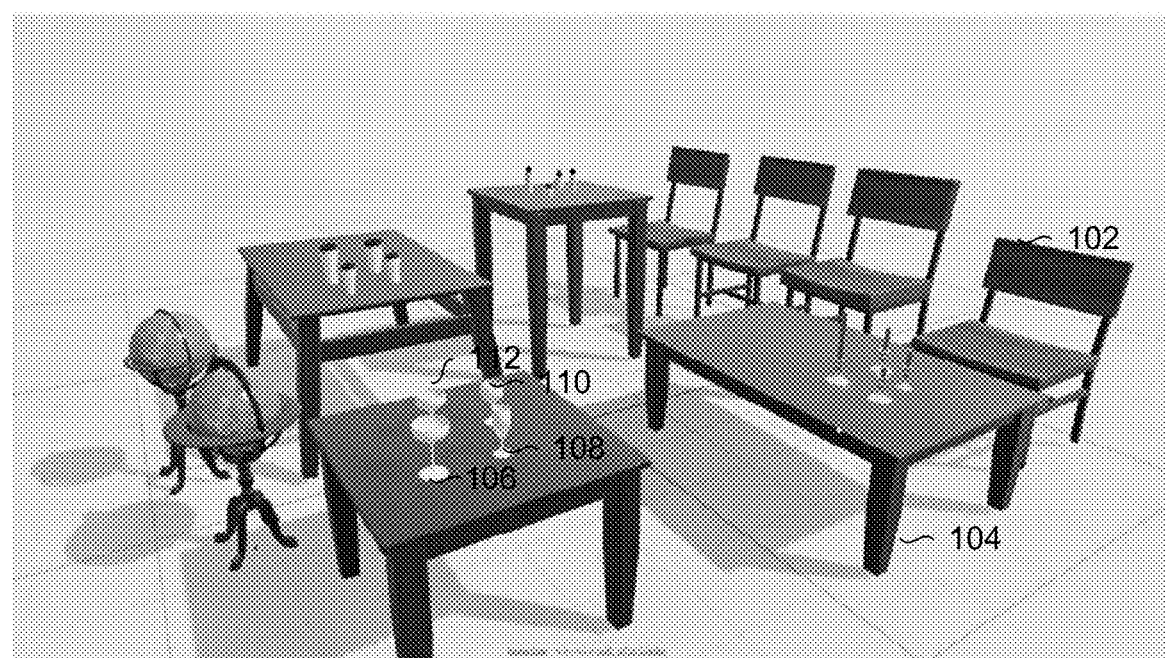
FIG. 1 depicts a scene in which objects are presented.

Oftentimes, a user desires to modify or edit an object rendered via a three-dimensional model. For instance, a user may desire to rotate, translate, and/or scale a three-dimensional object presented within a virtual scene. By way of example only, and with brief reference to FIG. 1, a user may desire to manipulate various objects presented in the scene. As examples, a user may desire to modify the height of the chair 102 within the scene, change the size of the table 104 within the scene, manipulate the shape of glasses 106-112, or the like. However, because three-dimensional models generally include dense meshes of vertices and polygons, editing three-dimensional models can be challenging.

In some conventional methods, a three-dimensional model can be manipulated by editing wires or curves presented in association with the rendered object. As three-dimensional models include an extensive number of wires or curves, particularly complex three-dimensional models, editing the three-dimensional models can be overwhelming and tedious. In particular, exposing an extensive number of curves as editable can be an overwhelming experience for a user. For instance, a user may need to assess the numerous curves to decide a particular curve(s) to manipulate, which may result in trial-and-error manipulations. In addition, individually editing curves can be a labor-intensive task.

Accordingly, embodiments described herein are directed to intuitive and efficient editing of three-dimensional models. In particular, a user can intuitively and efficiently manipulate a feature (e.g., curve) of a rendered object to effectuate editing of the corresponding three-dimensional model. At a high level, a set of features (e.g., curves) are clustered or grouped together based on analysis of the features, such as, for instance, properties, relationships, and/or distances. An editing handle can then be generated and displayed in association with the feature set such that a manipulation(s) of the editing handle results in similar edits applied to each of the features of the feature set. By presenting a particular editing handle for a group of features, editing the rendered object, or three-dimensional model associated therewith, can be more intuitive for a user. For example, rather than each feature having a corresponding editing handle and thereby cluttering the display, fewer editing handles can be presented and manipulated by a user.

As described herein, upon a manipulation of an editing handle, for example, to edit an object by performing translation, rotation, and/or scaling, the appropriate edit can be propagated to other features such that the object, and three-dimensional model, can be efficiently edited. In embodiments, a region of influence can be determined or identified such that edits are applied or propagated to features within the region of influence. Utilizing a region of influence to define edit propagation can enable a portion of features associated with the three-dimensional model to be edited. This can be advantageous as a user may desire to only modify a portion of features, and not an entire set of features, associated with a three-dimensional model. A region of influence can be determined in any of a number of ways. For example, a region of influence in which to propagate edits may be automatically determined based on properties, relationships, and/or distances associated with the features. As another example, a region of influence may be provided or modified via user input or selection.

Figure 2:
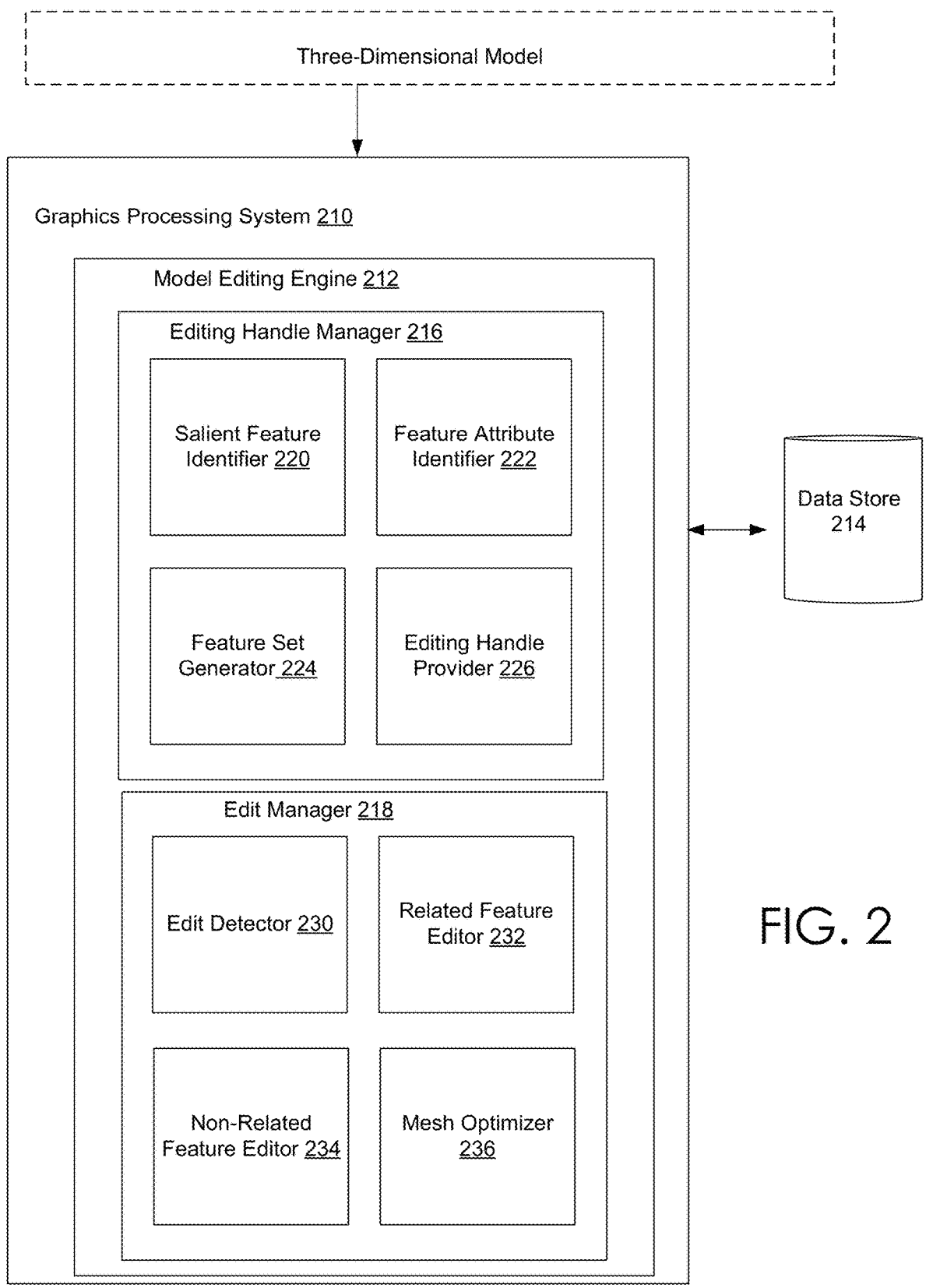
FIG. 2 depicts aspects of an illustrative graphics processing system for implementing a model editing engine, in accordance with various embodiments of the present disclosure.

Turning now to FIG. 2, FIG. 2 depicts an example configuration of an illustrative graphics processing system 210 for implementing a model editing engine 212 that efficiently and effectively facilitates three-dimensional model editing, in accordance with various embodiments of the present disclosure. As shown in FIG. 2, a data store 214 may be accessible to the graphics processing system 210. Data store 214 can store computer instructions (e.g., software program instructions, routines, or services) and/or data used in embodiments described herein. In some implementations, data store 214 stores information or data received via the various components of model editing engine 212 and provides the various components with access to that information or data, as needed. Although depicted as a single component, data store 214 may be embodied as one or more data stores. Further, the information in data store 214 may be distributed in any suitable manner across one or more data stores for storage (which may be hosted externally). In embodiments, data stored in data store 214 includes feature attributes (e.g., properties, relationships, or the like), user preferences, or the like.

Figure 8:
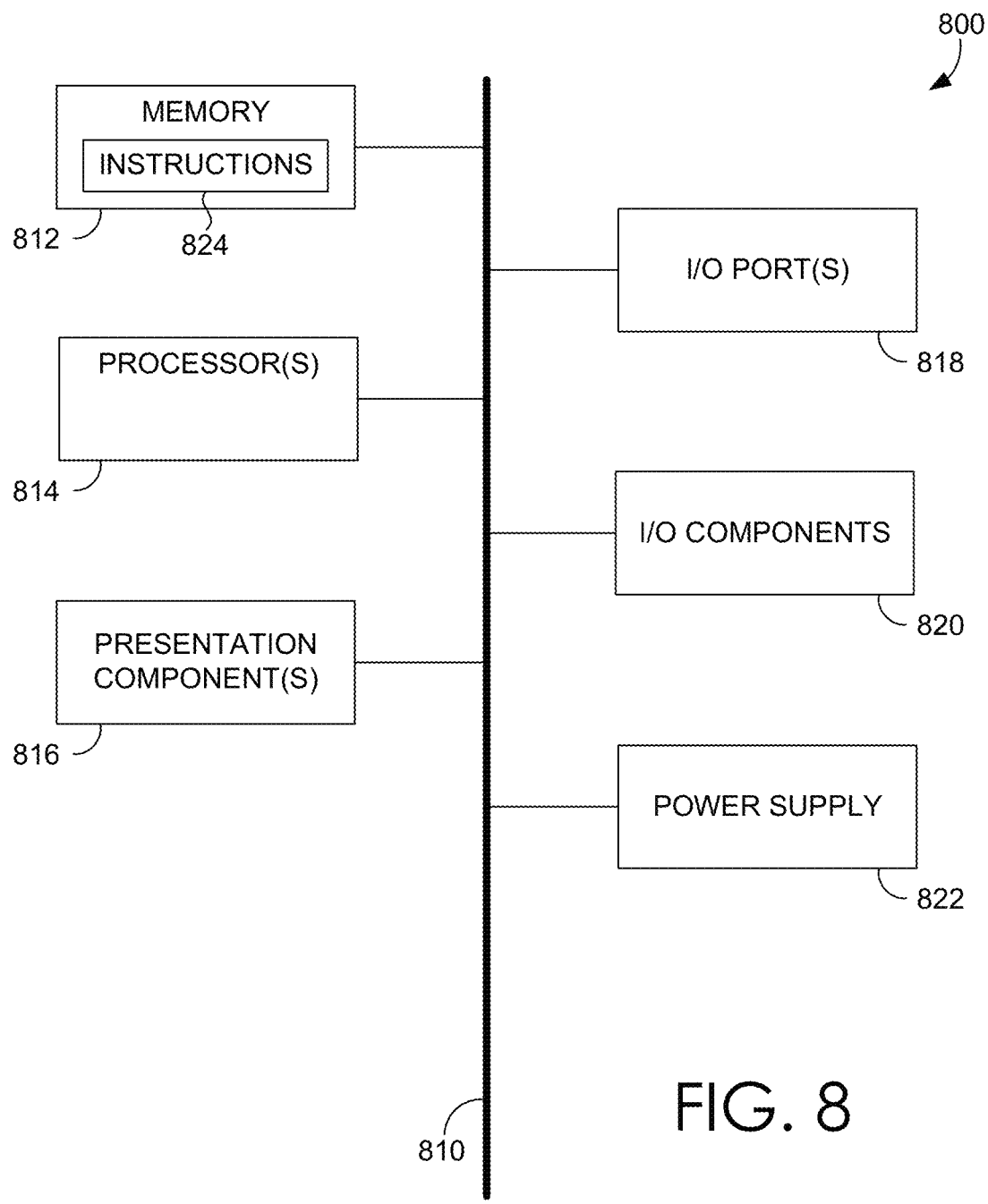
FIG. 8 is a block diagram of an example computing device in which embodiments of the present disclosure may be employed.

Graphics processing system 210 can be any type of processing system executed by instructions on a computing device. Graphics processing system 210 can operate on any type of computing device, such as a user device and/or a server. An example of a computing device with such instructions is depicted in FIG. 8. Although the model editing engine 212, and corresponding components, are generally described herein as operating on a computing device, as can be appreciated, the components or functionality associated therewith, can be distributed among devices (e.g., in a cloud computing or distributed computing environment). By way of example only, salient feature identifier 220 may operate via a server in communication with a user device hosting the graphics processing system 210.

As depicted, graphics processing system 110 includes a model editing engine 212. As described, the model editing engine 212 facilitates intuitive, efficient, and effective three-dimensional model editing. Generally, and at a high level, the model editing engine 212 includes an editing handle manager 216 and an edit manager 218. The editing handle manager 216 generally manages generating and providing editing handles. As described herein, an editing handle enables a user to edit a set of features (curves) associated with a three-dimensional model. In accordance with detecting a manipulation of an editing handle, the edit manager 218 manages appropriate edits corresponding with the three-dimensional model.

The model editing engine 212 can obtain as input a three-dimensional model defining an object(s). In some embodiments, an object defined by a three-dimensional model may represent a man-made object, for which salient features may be more readily detectable. A three-dimensional model can be obtained in any number of ways. As one example, upon opening an image or scene including one or more three-dimensional models, such three-dimensional models may be provided to the model editing engine 212. As another example, a user may select an object in an image or scene. In accordance with the user selection, the three-dimensional model representing the object may be provided to the model editing engine 212. Further, three-dimensional models may be obtained from any of a number of sources. For example, in some cases, three-dimensional models may be obtained from data store 214 accessible to the model editing engine 212. In other cases, three-dimensional models may be communicated from a server (e.g., over a network).

Upon obtaining a three-dimensional model, the editing handle manager 216 is generally configured to generate and provide a set of editing handles. An editing handle refers to a handle or tool presented via a graphical user interface that allows a user to edit or manipulate an object, or a portion thereof (e.g., a set of features). For instance, by selecting and dragging an editing handle positioned in accordance with a feature (e.g., curve) of a three-dimensional model, a user can initiate manipulations or edits to a three-dimensional object.

In embodiments, the editing handle manager 216 may include a salient feature identifier 220, a feature attribute identifier 222, a feature set generator 224, and an editing handle provider 226. As can be appreciated, any number of components can be used to perform functionality described herein and embodiments should not be limited to those described herein.

A salient feature identifier 220 is generally configured to identify salient features associated with the three-dimensional model. A salient feature generally refers to a noticeable or prominent feature. In accordance with embodiments described herein, the salient feature identifier 220 generally identifies salient geometric features. A feature or geometric feature generally refers to a feature related to geometry of a three-dimensional model. A feature may be, for example, a curve, wire, or line segment corresponding with a three-dimensional model. In this regard, the salient feature identifier 220 can identify a set of curves associated with the three-dimensional model. Although salient features are generally described herein as curves (wires, line segments), as can be appreciated, other geometric features may be additionally or alternatively identified.

Various methods may be employed to identify salient features associated with three-dimensional models. As one example, as three-dimensional models, or meshes, include triangles, salient features may be identified by assessing angles. To this end, salient features may be identified based on a degree of an angle. For example, assume an angle exceeds a degree threshold indicating a sharp feature. In such a case, curves, or edges, that correspond with that angle can be identified as salient features. As another example, a machine learning algorithm might be trained and used to detect salient features. Any number of methods may be employed and is not intended to limit the scope of embodiments.

A feature attribute identifier 222 is generally configured to identify feature attributes associated with the identified salient features (e.g., curves). In this way, feature attributes that may be desired to be preserved during edits can be identified. A feature attribute, as used herein, generally refers to an attribute or aspect associated with a feature or set of features of a three-dimensional model. A feature attribute may be a property, relationship, and/or proximity. Generally, a property refers to any type of property, characteristic, or aspect of a feature (e.g., a particular curve). A property may include an indication of linearity, circularity, planarity, or the like. A relationship attribute refers to an indication of a relationship between multiple (two or more) features. For instance, a relationship attribute may indicate properties shared by two or more features. A relationship may include an indication of co-planarity, parallelism, symmetry, concentricity, or the like. Proximity attribute generally refers to a spatial distance between features. Proximity can be measured in a variety of ways.

Figure 3:
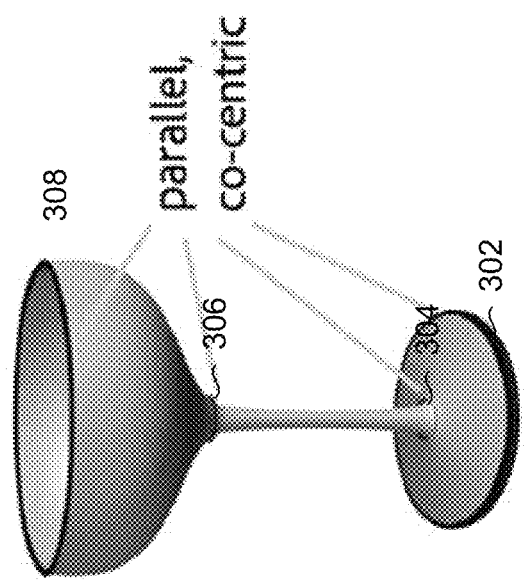
FIG. 3 depicts a three-dimensional object having various curves, in accordance with various embodiments of the present disclosure.

In this regard, the feature attribute identifier 222 can analyze the salient features and identify properties associated therewith. Similarly, the feature attribute identifier 222 can analyze the salient features and identify relationships and/or proximity therebetween. By way of example only, and with reference to FIG. 3, assume that curves 302, 304, 306, and 308 are identified as salient curves corresponding with a three-dimensional model. In such a case, the feature attribute identifier 222 may identify that each of curves 302, 304, 306, and 308 are concentric and parallel with one another.

A feature set generator 224 is configured to generate sets, groups, or clusters of related features. Related features generally refer to features (e.g., curves) of a three-dimensional model that are related to one another in some manner. Advantageously, clustering or grouping related features enables each related feature set to have a corresponding editing handle, such that the related feature set can be edited uniformly. Further, presenting a single editing handle for a set of related features reduces the amount of editing handles displayed and, as such, can improve user satisfaction.

Determining related features can be performed in any of a variety of ways. In one implementation, feature attributes, such as properties, relationships, and/or proximity, may be analyzed and used to determine related features. At a high level, features with similar properties, having relationships with one another, and/or proximate to one another, may be identified and used to generate a related feature set. Various measurements, thresholds, or the like may be used to determine a set of related features. For example, features within a threshold distance from one another may be considered related. Further, feature attributes may be weighted such that one attribute or type of attribute (e.g., relationship) may be weighted higher than another attribute or type of attribute (e.g., property) in determining relatedness between features.

Other geometric aspects may additionally or alternatively be utilized to determine related features. For example, in some implementations, geometric primitives can be utilized to cluster or group features. In such implementations, primitives may be detected in association with the object. In accordance with a detected primitive (e.g., body of a bottle), features associated with a particular primitive may be grouped together or designated as related features, or otherwise used to determined related feature.

In some cases, features can be related in a hierarchical structure. For example, a parent node of a hierarchy may represent each salient feature of the three-dimensional model, and children node can then include various combinations of features. In this way, the last child node of the hierarchical paths may represent a particular feature. As described herein, relating features in a hierarchical structure enables a user to select different levels of related features. As such, a user may refine selection of related features contained in a feature set. For instance, in the event a top level including each salient feature is selected, a single editing handle may be presented for editing the features. In the event a middle level including multiple subsets of related features is selected, an editing handle corresponding with each subset of related features may be presented. In the event a bottom level is selected, an editing handle may be presented for each feature.

An editing handle provider 226 is generally configured to provide a set of editing handles to enable editing of the three-dimensional model, or portion thereof (e.g., a feature set including a group of related curves). In this regard, an editing handle may be generated and provided for one or more related feature sets. Advantageously, providing an editing handle for a related feature set enables multiple features to be manipulated or edited with manipulation of a single editing handle. Further, providing an editing handle that represents multiple features generally reduces the amount of visual clutter presented on a display screen.

In some cases, a portion of the related feature sets may be selected or identified for providing editing handles. Selecting a portion of feature sets for presenting editing handles reduces the number of editing handles provided for display can further reduce visual clutter on the display screen and increase user experience. In this way, a user is less likely to be overwhelmed by the presence of an extensive amount of editing handles. By way of example only, assume that ten different feature sets are generated. Instead of presenting each of the ten different feature sets and/or editing handles associated therewith, a portion (e.g., 3) of the feature sets may be selected for presentation.

The specific feature sets for which to generate and/or display editing handles can be determined in any of a number of ways. In some cases, a feature set score may be generated and used to rank the feature sets. A feature set score may be determined, for example, based on an extent of prominence or salience of the features, an extent of relatedness of the feature sets, a type of property corresponding with features, or the like. In other cases, specific feature sets for which to generate and/or display editing handles may be based on a level within a hierarchical structure. For instance, feature sets represented in a particular middle level tier may be selected for generating and/or displaying editing handles. Additionally or alternatively, in some cases, a user may select a number of feature sets desired to be presented, a level within a hierarchical structure desired to be presented, or the like. As one example, specific feature sets for which to generate and/or present an editing handle may be automatically determined by the editing handle provider 226. Upon presenting editing handles corresponding with specific feature sets, a user may interact with the graphical user interface to increase or decrease a level in the hierarchical structure. For instance, assume a user desires to view less feature sets and corresponding editing handles. In such a case, a user may indicate to increase a level in the hierarchical structure such that fewer feature sets and corresponding editing handles are presented. As another example, a user may select one or more features (e.g., curves). Based on the selected features, the corresponding feature sets can be visually represented along with appropriate editing handles.

An editing handle can be generated for each related feature set to be visually emphasized. In this regard, for each related feature set to be visually represented (e.g., each identified feature set or each selected feature set), a single editing handle may be generated to coordinate editing for the feature set. As described, utilizing a single editing handle for a set of features (e.g., curves) can reduce the clutter presented in association with display of the object.

In embodiments, the editing handle provider 226 can select or identify a particular feature to represent or correspond with the editing handle. For example, assume a feature set includes five related curves. In such a case, one of the five curves can be selected such that the selected curve is presented in association with the editing handle. In other embodiments, the editing handle may not directly correspond to any of the corresponding feature sets. For instance, assume one particular group of related curves are visually emphasized. In such a case, an editing handle may be provide in a particular location on the display (e.g., a task bar, corner, etc.) that is not necessarily adjacent to the related curves, or even the object.

The editing handle(s) can be presented via a graphical user interface. In particular, an editing handle can be visually represented in accordance with the object. As can be appreciated, the editing handle can be presented in any of a number of ways. In some cases, the editing handle corresponding with a feature set may be positioned proximate or adjacent to a corresponding feature set, or particular feature of the feature set. Other visual representations or emphasis may be used to show a relation between an editing handle and a particular feature set. For instance, color (e.g., editing handle same color as visual representation of corresponding curves), line width (e.g., editing handle same width or size as visual representation of corresponding curves), or other indicators may be used to signal to a user that a particular editing handle corresponds with a particular feature set.

As can be appreciated, in some implementations, an editing handle for a feature set may have multiple components, details, or aspects to account for multiple manipulation or editing effects. For example, assume a curve can be manipulated by translating, rotating, and/or scaling. In such a case, a first editing handle component may be presented to facilitate translation of the curve, a second editing handle component may be presented to facilitate rotation of the curve, and a third editing handle component may be presented to facilitate scaling of the curve.

In addition to presenting editing handles, visual representations of features (e.g., curves) and/or feature sets in the three-dimensional model can be presented. For example, curves can be visually emphasized by color or other formatting. In some cases, features of a particular feature set can each be presented in one color or format to distinguish from features of a different feature set presented in another color.

Figure 4:
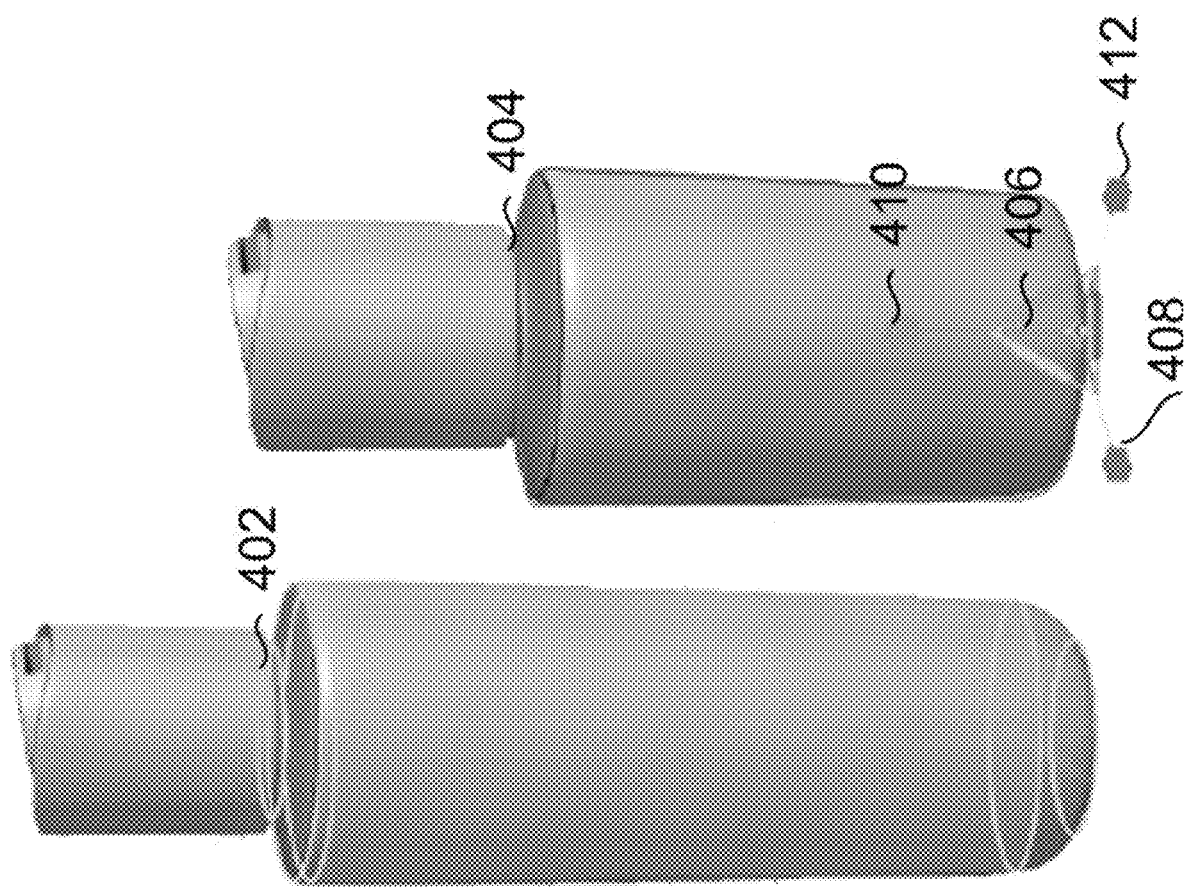
FIG. 4 depicts a set of three-dimensional objects including an editing handle, in accordance with various embodiments of the present disclosure.

As previously described, a graphical user interface may include various components that enable a user to select or provide preferences related to the display of editing handles, feature sets, and/or features. For instance, a user may select to increase or decrease the number of feature sets visually emphasized. By way of example only, and with reference to FIG. 4, assume a first feature set 402 is represented in a first color (e.g., yellow). A user may toggle to view a second feature set 404, which can be represented in a second color (e.g., blue). Based on a user's interest in editing a curve in this second feature set (e.g., a user selection to edit), an editing handle 406 associated with the second feature set may be presented. Editing handle 406 includes a first component 408 that facilitates rotation of the second feature set, a second component 410 that facilitates translation of the second feature set, and a third component 412 that facilitates scaling of the second feature set.

Returning to FIG. 2, the edit manager 218 is generally configured to edit three-dimensional models, or portions thereof. In embodiments, the edit manager 218 includes edit detector 230, related feature editor 232, non-related feature editor 234, and mesh optimizer 236.

The edit detector 230 is generally configured to detect edit indications by way of an editing handle. In this regard, the edit detector 230 can detect movement, selection, or manipulations to the editing handle, or portion thereof, indicating a translation, rotation, and/or scaling of the corresponding feature and/or feature set. As previously described, an editing handle may include different components that can be used to manipulate or edit a three-dimensional model in different manners. As such, the edit detector 230 may detect which component is being manipulated and the manner in which it is being manipulated. For example, assume a user selects a translation component of the editing handle and drags the editing handle, or translation component, selected by a user to the right. In such a case, the edit detector 230 may detect a translation in a magnitude and direction corresponding with the manipulation of the editing handle.

The related feature editor 232 is configured to edit the feature(s) corresponding with the manipulated editing handle. In this regard, an editing operation can be determined and applied in accordance with the detected edit manipulation or indication. For instance, an editing operation can be determined that corresponds with the manipulation applied to the editing handle. The editing operation can then be applied to the feature corresponding with the manipulated editing handle.

In addition, in embodiments, the related feature editor 232 applies the determined editing operation to other features in the related feature set. In this way, each feature in the related feature set corresponding with the editing handle may be manipulated in a similar manner. By way of example only, assume a feature set includes a first curve, a second curve, and a third curve. Now assume that a user manipulates an editing handle displayed in association with the first curve. For instance, the user indicates to rotate the first curve. Upon detecting a rotation operation for the first curve, the related feature editor 232 can trigger or effectuate application of the rotation operation to the first curve, the second curve, and the third curve. Advantageously, propagating the edit manipulation to the other related curves preserves the relationships between the curves. For instance, if two curves are identified to be reflective symmetric, rotating one results in automatic rotation of the other related curves.

The non-related feature editor 234 is generally configured to edit non-related features and feature sets. A non-related feature or feature set refers to a feature or feature set that is not identified as being within, or part of, a related feature set. In this way, features that are not in the related feature set can also be manipulated in accordance with a user edit. By way of example, assume a first curve is edited, but a fourth and fifth curve, not in the same feature set as the first curve, share some relation with the first curve (e.g., each concentric). To preserve the attribute (e.g., relationship, property, distance), the non-related feature editor can propagate the editing operation to other non-related features in the three-dimensional model.

In some embodiments, the non-related features and/or feature sets to edit may be determined based on a region of influence. In this regard, edits may be propagated to features within a region of influence. Applying edits to features within a region of influence can specify how the edit impacts other aspects of the three-dimensional model. In some cases, a region of influence may include an entire three-dimensional model. In this regard, manipulation of one feature or feature set can result in manipulation of each feature identified in the three-dimensional model. In other cases, a region of influence may be a portion of the three-dimensional object such that unexpected global changes are avoided. This can enable relationships among features and/or feature sets to be maintained without applying global edits to the three-dimensional model. A region of influence can be determined or defined in any number of ways (e.g., via machine learning or heuristically). For instance, a region of influence may be determined based on properties, relationships, distances, primitives, or the like.

By way of example, and returning to FIG. 3, assume a curve 302 is selected for editing and that curve 302 is the only curve in a feature set. As such, curve 302 can be edited in accordance with the user specified manipulation. In analyzing various feature attributes associated with other features in the three-dimensional model, assume it is determined that the co-planarity of curve 302, 304, 306, and 308 is desired to be maintained. In such a case, curves 304, 306, and 308 may be determined to be within the region of influence such that edits (e.g., rotation edits) are propagated to such curves. As can be appreciated, regions of influence may vary depending on a type of edit to apply. For instance, continuing with this example, scaling curve 302 may result in a region of influence that includes curve 304, but excludes curve 306 and 308. This permits the base of the glass to be modified (e.g., enlarged) without resulting in modification to the rim of the glass.

In some implementations, a graphical user interface may be configured to enable a user to select or modify a region of influence. As one example, a user may select, either specific features or an area/region, the user desires to include in the region of influence, such that edits are propagated to those selected features or features within the selected region. As another example, a region of influence may be automatically determined, for instance, via the non-related feature editor 234 (e.g., based on analysis of properties, relationships, distances, etc.). In such a case, via a graphical user interface, a user may confirm the determined region of influence or select to modify the automatically determined region of influence to effect more or less of the three-dimensional model. Modifying a region of influence can be performed in any number of ways and is not intended to limit embodiments described herein. As one example, a slider may be positioned that enables a user to increase or decrease the size of the region of influence (e.g., based on distance to initially edited feature). As another example, a user may select or deselect specific features to include or exclude in the region of influence.

The mesh optimizer 236 is generally configured to update or modify the three-dimensional model based on the positions or edits identified for features (e.g. curves). In this regard, the mesh optimizer 236 extends edits identified for features in the three-dimensional model (e.g., as described above) to all vertices of the three-dimensional model. Mesh optimization can be performed in any number of ways. In one implementation, an as-rigid-as-possible deformation method that incorporates additional smoothness constraints can be employed to perform mesh optimization.

Figure 5:
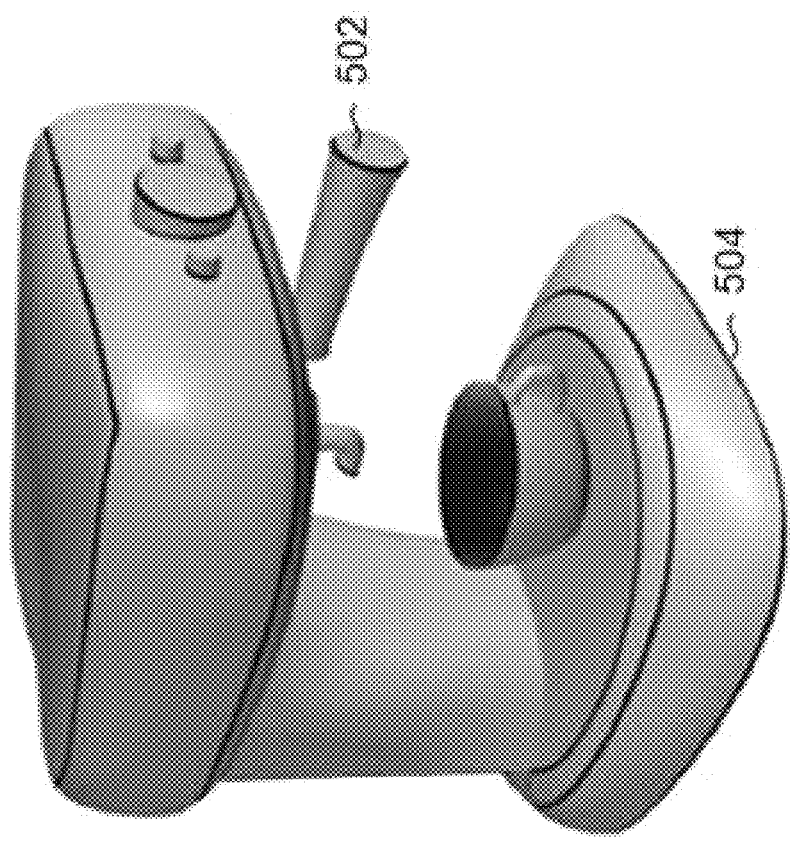
FIG. 5 depicts another three-dimensional object having disconnected components, in accordance with various embodiments of the present disclosure.

In some cases, an input three-dimensional model, or mesh, can include disconnected components (e.g., of an object). By way of example only, and with reference to FIG. 5, the handle of the expresso machine 502 may have a mesh that is disconnected from the body of the expresso machine 504. In this regard, there may be no connection between the vertices and/or triangles on the three-dimensional mesh corresponding with the handle of the expresso machine 502 and the vertices and/or triangles on the three-dimensional mesh corresponding with the body of the expresso machine 504. Even though disconnected meshes, however, edits made to features within one component may be desired to be made to features corresponding with another component. This may be the case even if salient features are not identified in the disconnected component. For instance, if the body of the expresso machine 504 is translated or rotated, component 504 may be desired to be edited accordingly even though a salient feature may not have been detected in association with component 504.

As such, the mesh optimizer 236 may be configured to identify and analyze disconnected components within the three-dimensional model or mesh. Upon identifying disconnected components, the disconnected components may be analyzed to determine whether to propagate modifications to the disconnected components. Such a determination may be made in any number of ways, including, for example, based on distance between the components. For instance, if the disconnected component is within a threshold distance, edit propagation may be applied. Alternatively or additionally, if the bounding box of the disconnected component intersects with or is within a threshold distance to the bounding box of the edited component, edit propagation may be applied to the disconnected component.

As another example for determining whether to propagate modifications to a disconnected component, size of components may be analyzed to determine whether an edit should be applied to a disconnected component. For instance, in some cases, if the identified disconnected component is a smaller component, it can be determined to propagate edits to the disconnected component. On the other hand, if the identified disconnected component is a larger component, it can be determined not to propagate edits to the disconnected component.

In operation, a hierarchy tree can be constructed to facilitate such analysis of disconnected components (e.g., in relation to distance and/or component sizes). By way of example only, a hierarchy tree of the components can be generated based on proximity and/or size relations. To this end, a directed graph can be constructed where each component is a node and edges are between two nearby components directed from the bigger component towards the smaller component. The minimum spanning tree can be treated as the hierarchy tree. As such, as the user edits handles corresponding with one component, the edit can be propagated to children components, but not vice versa.

Upon identifying to propagate edits to a disconnected component, the mesh optimizer 236 may utilize such information in performing the mesh optimization. For example, an additional constraint may be defined to achieve the edit across components. By way of example, a constraint indicating that a vertex on the edited component should be manipulated similarly to a vertex on the disconnected component such that mesh optimization can propagate to the disconnected component as well as the edited component. To this end, a vertex on the edited component and a vertex on the disconnected component may be defined or designated as an attachment points to utilize as a constraint. In this way, relative positioning of the attachment points can be preserved or maintained during mesh optimization.

Figure 6:
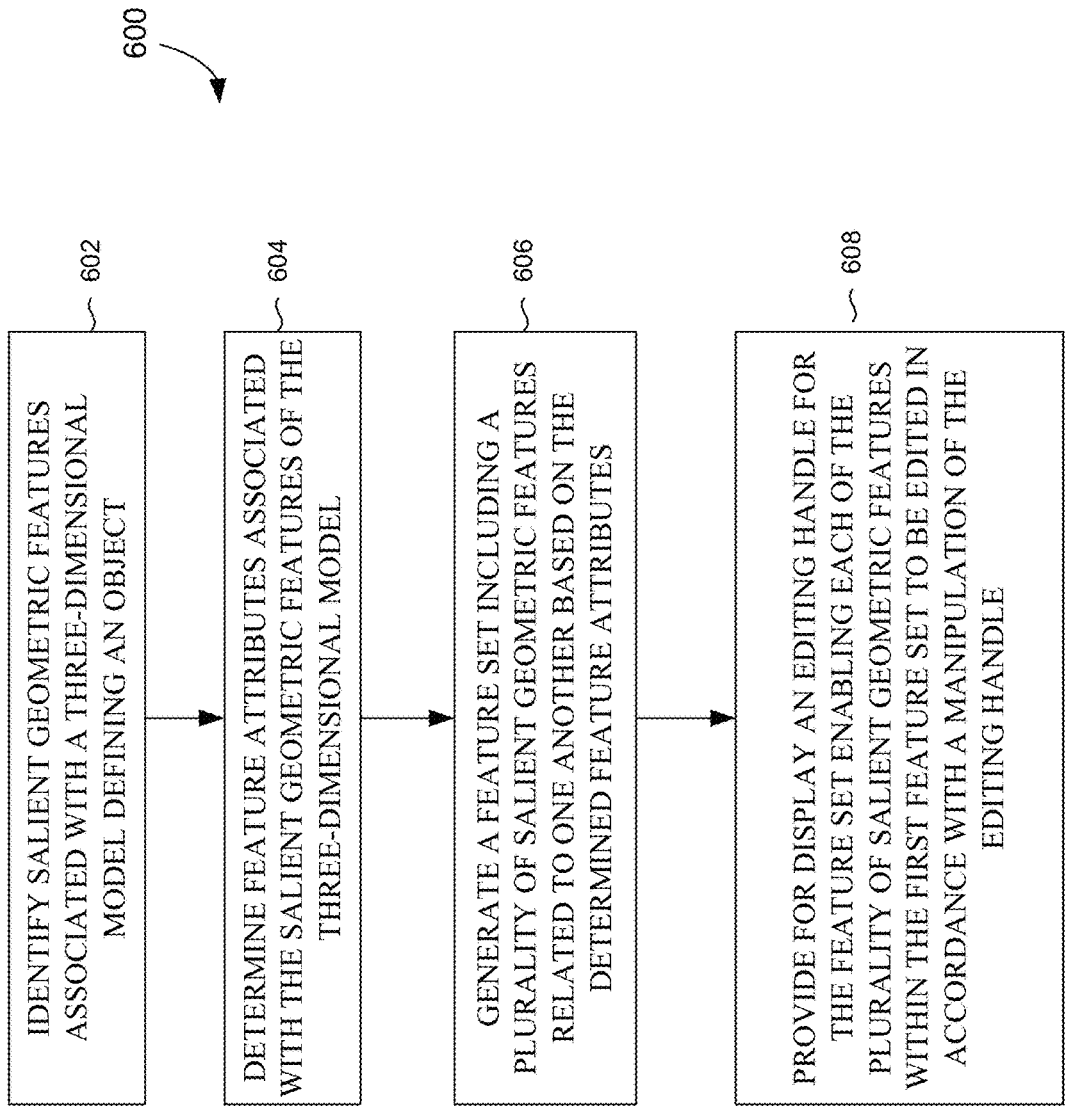
FIG. 6 illustrates a first process flow facilitating three-dimensional model editing, in accordance with various embodiments of the present disclosure.

FIG. 6 illustrates a process flow 600 depicting an example embodiment of facilitating edits of a three-dimensional model, in accordance with various embodiments of the present disclosure. Process flow 600 can be carried out, for example by a model editing engine as discussed with reference to FIG. 2.

As depicted, process flow 600 begins at block 602 at which salient geometric features associated with a three-dimensional model defining an object are identified. As described herein, salient geometric features may be prominent curves associated with the three-dimensional model. At block 604, feature attributes associated with the salient geometric features of the three-dimensional model are determined. Such feature attributes may include, for example, properties, relationships, distances, primitives, and/or the like. At block 606, a feature set is generated including a plurality of salient geometric features related to one another based on the determined feature attributes. As can be appreciated, any number of feature sets can be generated. In cases that multiple feature sets are generated, in some implementations, a selection may be made to select a particular or particular set of feature sets to present and/or for which to generate and present editing handles. At block 608, an editing handle for the feature set is provided for display. The editing handle enables each of the plurality of salient geometric features within the feature set to be edited in accordance with a manipulation of the editing handle. As can be appreciated, the editing handle can be displayed in association with one of the plurality of salient geometric features.

Figure 7:
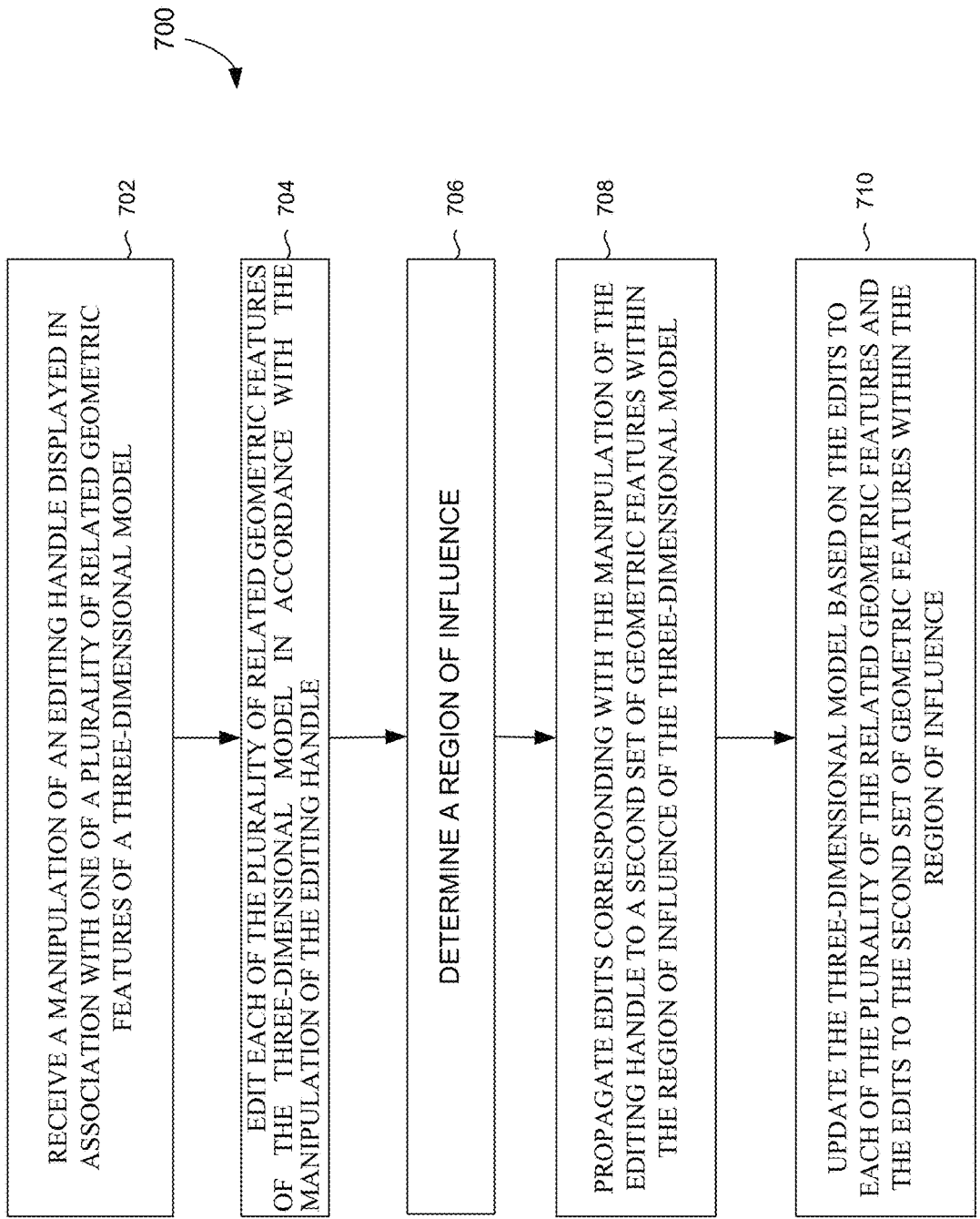
FIG. 7 illustrates a second process flow facilitating three-dimensional model editing, in accordance with various embodiments of the present disclosure.

Turning to FIG. 7, FIG. 7 illustrates a process flow 700 depicting an example embodiment of facilitating edits of a three-dimensional model, in accordance with various embodiments of the present disclosure. Process flow 700 can be carried out, for example by a model editing engine as discussed with reference to FIG. 2.

As depicted, process flow 700 begins at block 702 at which a manipulation of an editing handle displayed in association with one of a plurality of related geometric features of a three-dimensional model is received. The manipulation can indicate to perform a rotation, a translation, or a scaling operation to a three-dimensional model, or portion thereof. At block 704, each of the plurality of related geometric features of the three-dimensional model are edited in accordance with the manipulation of the editing handle. At block 706, a region of influence within the three-dimensional model is determined. Such a determination can be made, for example, based on analysis of properties, relationships, distances, primitives, or the like of geometric features. Alternatively or additionally, a region of influence may be determined or modified based on user input. At block 708, edits corresponding with the manipulation of the editing handle are propagate to a second set of geometric features within the region of influence of the three-dimensional model. At block 710, the three-dimensional model is updated (e.g., mesh optimization) based on the edits to each of the plurality of the related geometric features and the edits to the second set of geometric features within the region of influence.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 8 is merely illustrative of an example computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 800 includes one or more processors that read data from various entities such as memory 812 or I/O components 820. Presentation component(s) 816 present data indications to a user or other device. Illustrative presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for editing three-dimensional models, the method comprising:
   identifying salient geometric features associated with a three-dimensional model defining an object;
   determining feature attributes associated with the salient geometric features of the three-dimensional model, wherein the feature attributes comprise properties, relationships, or proximities;
   generating a first feature set including a first plurality of salient geometric features related to one another based on the determined feature attributes; and
   causing a display of an editing handle for the first feature set enabling the first plurality of salient geometric features within the first feature set to be edited in a three-dimensional space in accordance with a user manipulation of the editing handle that is displayed in association with one of the plurality of salient geometric features, wherein the user manipulation of the editing handle further edits a second plurality of salient geometric features of a second feature set within a region of influence, the first plurality of salient geometric features of the first feature set being different from the second plurality of salient geometric features of the second feature set, and wherein the edits to the second plurality of salient geometric features within the region of influence preserves at least one attribute of the second plurality of salient geometric features that is shared with the first plurality of salient geometric features.

2. The computer-implemented method of claim 1, wherein the salient geometric features comprise curves associated with the three-dimensional model.

3. The computer-implemented method of claim 1, wherein the feature attributes comprise geometric primitives.

4. The computer-implemented method of claim 1, wherein the properties comprise linearity, circularity, planarity, or a combination thereof.

5. The computer-implemented method of claim 1, wherein the relationships comprise co-planarity, parallelism, symmetry, concentricity, or a combination thereof.

6. The computer-implemented method of claim 1, wherein the determined feature attributes are weighted by a corresponding attribute type.

7. The computer-implemented method of claim 1, wherein each of the first plurality of salient geometric features within the first feature set are visually emphasized in association with presentation of the object.

8. The computer-implemented method of claim 1, wherein the editing handle includes a first portion to enable editing of the three-dimensional model via a translation operation, a second portion to enable editing of the three-dimensional model via a rotation operation, and a third portion to enable editing of the three-dimensional model via a scaling operation.

9. The computer-implemented method of claim 1 further comprising:
   generating a third feature set of salient geometric features related to one another based on at least one of the determined feature attributes; and
   causing a display of a third editing handle for the third feature set enabling each of a third plurality of salient geometric features within the third feature set to be edited in accordance with a manipulation of the third editing handle, the third editing handle displayed in association with one of the third plurality of salient geometric features.

10. The computer-implemented method of claim 9, wherein the third editing handle is displayed concurrently with the first editing handle.

11. One or more non-transitory computer-readable media having a plurality of executable instructions embodied thereon, which, when executed by one or more processors, cause the one or more processors to perform a method for editing three-dimensional models, the method comprising:
   receiving a manipulation of an editing handle displayed in association with one of a plurality of related geometric features of a three-dimensional model, the manipulation indicating to perform an edit operation to a three-dimensional model;
   determining a region of influence of the three-dimensional model, wherein the region of influence comprises a set of geometric features distinct from the plurality of related geometric features, wherein determining the region of influence is based on a type of edit operation indicated by the manipulation of the editing handle displayed in association with one of the plurality of related geometric features;

propagating edits corresponding with the manipulation of the editing handle to the set of geometric features within the region of influence of the three-dimensional model, wherein propagating edits to the set of geometric features preserves an attribute of the set of geometric features that is shared with the one of the plurality of related geometric features, wherein the attribute includes at least one of a property, a relationship, or a proximity; and updating the three-dimensional model based on the edits to the set of geometric features within the region of influence.

12. The one or more computer-readable media of claim 11, wherein propagating edits to the set of geometric features comprises rotating, translating, and/or scaling the corresponding features.

13. The one or more computer-readable media of claim 11 further comprising determining the region of influence of the three-dimensional model based on properties, relationships, distances, primitives, or a combination thereof, associated with geometric features of the three-dimensional model.

14. The one or more computer-readable media of claim 11 further comprising determining the region of influence based on a user selection of a portion of an object defined by the three-dimensional model.

15. The one or more computer-readable media of claim 11 further comprising:

automatically determining the region of influence of the three-dimensional model based on properties, relationships, distances, primitives, or a combination thereof, associated with geometric features of the three-dimensional model;

receiving, via a graphical user interface, a user selection to modify the region of influence to effect edits in more or less of the three-dimensional model.

16. The one or more computer-readable media of claim 11, wherein updating the three-dimensional model comprises propagating edits to a disconnected component that is within a threshold distance to a component being edited.

17. A computing system comprising:

means for generating an editing handle for a plurality of related curves associated with a three-dimensional model; and means for editing the three-dimensional model in accordance with a manipulation to the editing handle, the editing including applying edits to the plurality of related curves associated with the three-dimensional model, wherein editing the three-dimensional model further comprises editing other curves within a region of influence within the three-dimensional model to preserve at least one attribute of the other curves within the region of influence that is shared with the plurality of related curves, wherein the at least one attribute includes at least one of a property, a relationship, or a proximity associated with the plurality of related curves.

18. The computing system of claim 17, wherein the region of influence is determined based on properties, relationships, distances, primitives, or a combination thereof, associated with curves of the three-dimensional model.

19. The computing system of claim 17, wherein the region of influence is selected or modified by a user via a graphical user interface.

* * * * *